Sept. 8, 1942. T. L. YATES 2,295,316
JOINT
Filed May 6, 1939

Tom L. Yates
INVENTOR.

BY H. C. Lord
ATTORNEYS.

Patented Sept. 8, 1942

2,295,316

UNITED STATES PATENT OFFICE 2,295,316

JOINT

Tom L. Yates, Millcreek Township, Erie County, Pa., assignor, by mesne assignments, to Lord Manufacturing Company, Erie, Pa., a corporation of Pennsylvania Application May 6, 1939, Serial No. 272,250

4 Claims. (Cl. 64—11)

The present invention relates to improvements in joints, particularly joints adapted for forming flexible couplings between members arranged end to end. Ordinarily the members of the joint are merely attaching members to afford means for securing the coupling to the ends of the shafts to be connected. In order to provide sufficient body to the members for securing them positively to the shafts to be connected it is desirable to form the couplings with enlarged ends capable of receiving fastening means for clamping the members to the shafts. On the other hand it is desirable to provide smaller projections, or portions of the members for receiving the rubber to provide a greater amount of rubber for yieldingly connecting the joints, economy in material of the members and increasing the bonded area of the rubber engaging the members so that there may be less liability of breaking the bond. It is also desirable to so proportion the opposing ends of the members that the stress on the rubber by torque yielding is equalized, for instance, providing an opening in the rubber between the ends of the members and enlarging the rubber over this space. Features and details of the invention will appear from the specification and claims.

Figure 1:
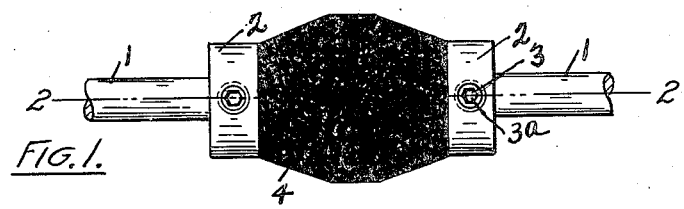

Preferred embodiments of the invention are illustrated in the accompanying drawing as follows:

Fig. 1 shows an elevation of the joint.

Figure 2:
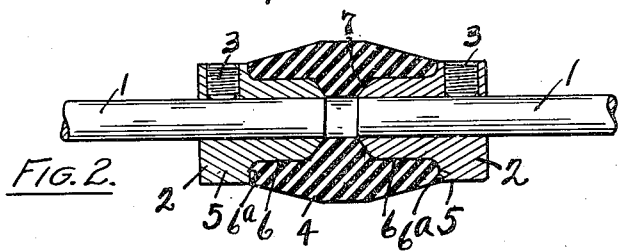

Fig. 2 a similar view in section on the line 2—2 in Fig. 1.

Figure 3:
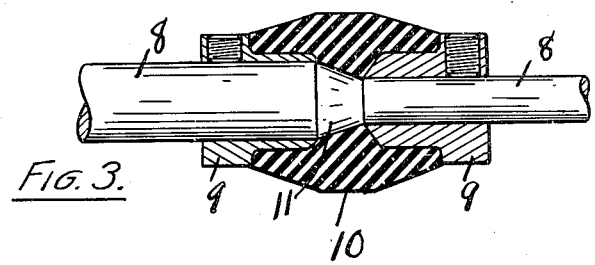

Fig. 3 a central section of a slight modification.

Figure 4:
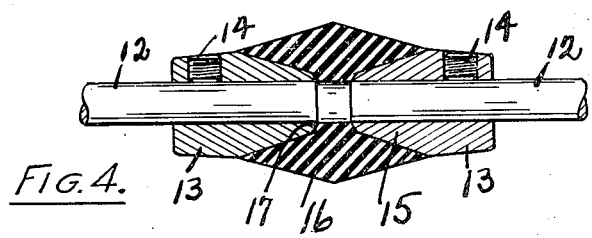

Fig. 4 a section of a further modification.

Figure 5:
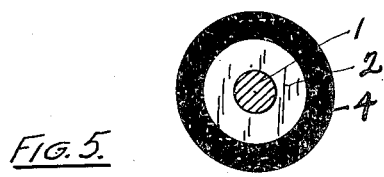

Fig. 5 an end view of the structure shown in Fig. 1.

1—1 mark the shafts to be connected, and 2—2 the members of the joint. These members have shaft receiving openings and are preferably secured to the shafts 1—1 by set screws 3—3 preferably having wrench-hold sockets 3a so that there is no projection in the assembled coupling. A rubber element 4 connects the joint members. The rubber element preferably has an opening in the space between the members corresponding to the shaft openings in the members. The joint members have enlarged ends 5 and projections 6 extending from the enlarged ends of smaller diameter, these projections forming shoulders 6a between the projections and the enlarged ends. A distinct radius is formed between the projection and the shoulders. This relieves the stress on the rubber at this point and facilitates the molding of the joint in that it prevents the forming of gas pockets at the corner. Ends 7 of the members are preferably tapered and the ends of the members spaced so as to give freedom of movement between the ends. This also increases the effective bond surface adjacent the edge. The rubber surrounds the projections 6, extends up along the shoulders 6a and extends down over the tapered portions 7 and is bonded to the enlarged surfaces. The enlargements 5 not only afford the shoulders 6a which increase the bonding area on the rubber, but carry that bonding area out toward the outer surface of the rubber of the joint so that it may be readily inspected. The enlarged ends afford ample means also for receiving fastening means, such as the set screws 3. The conical ends of the members equalize circumferential stresses on the rubber between these ends, that is to say, where there is the greatest movement at the outer periphery of the cones there is a greater intervening portion of rubber to accommodate the movement. The enlargement of the resilient rubber wall around the space gives greater torque value and still yields readily to off-setting and mis-alinement.

In Fig. 3 shafts 8—8 to be connected are of different sizes although members 9 are practically uniform in their outer dimensions. A rubber element 10 corresponds to the rubber element 4 and there is a tapered space 11 in the rubber between the ends to accommodate the difference in size of the shafts which can be readily taken care of in the molding operation. Otherwise the structure is substantially similar to Fig. 1.

In Fig. 4 there is a further modification in which connected shafts 12 have members 13 secured to them by set screws 14. The shafts have conical projections 15 which form the smaller dimension projections on the enlarged ends. A rubber element 16 covers the conical surfaces and follows around tapered ends 17 on the members. It is similar to that shown in Fig. 1 but lacks the definite shoulder 6a and therefore lacks, to some extent, the bonding area for the rubber.

What I claim as new is:

1. In a joint, the combination of two members to be joined end to end in spaced relation, the members having enlarged outer ends and smaller resilient material receiving projections extending toward the joint center; and an element of resilient material, such as rubber, joining the members and surrounding and bonded to the projections and extending in a direct wall from enlarged end to enlarged end, the wall of the element over the space between the ends being of larger diameter than at points nearer the enlarged ends and being resilient throughout the wall thickness to the outer periphery of the joint the element providing a connection between the members free from metallic contacts.

2. In a joint, the combination of two members to be joined end to end in spaced relation, the members having shouldered outer ends and smaller resilient material receiving projections of approximately uniform diameter extending toward the joint center and forming shoulders between the projections and the enlarged ends, the members having shaft-receiving openings and being larger throughout than the shaft opening for each member; and an element of resilient material, such as rubber, joining the members free from metallic contacts, the wall of said element extending outwardly on the shoulders and said element being bonded to the projections and the shoulders, the wall of the element extending directly from shoulder to shoulder and the wall surrounding the space between the members being larger than at points nearer the shoulders and being resilient throughout the wall thickness to the outer periphery of the joint.

3. In a joint, the combination of two members to be joined end to end in spaced relation, the members having enlarged outer ends and smaller resilient material receiving projections extending toward the joint center and having opposing tapered ends, the members having shaft-receiving openings extending through the members and the projections being larger throughout than the shaft openings; and an element of resilient material, such as rubber, joining the members free from metallic contacts and surrounding the projections between the enlarged ends and forming a direct wall from enlargement to enlargement and engaging the tapered inner ends of the members, the joint having openings extending from the openings in the member into the element in the space between the members and the wall of the element extending directly from one enlarged end to the other, said wall surrounding the space between the members being resilient throughout the wall thickness to the outer periphery of the joint.

4. In a joint, the combination of two members to be joined end to end in spaced relation, the members having shouldered outer ends and smaller resilient material receiving projections of approximately uniform diameter extending from the shouldered ends toward the joint center, the inner ends of the projections being tapered, said members having shaft-receiving openings extending through the members; and an element of resilient material, such as rubber, joining the members free from metallic contacts, said resilient element surrounding the projections and extending outwardly along the faces of the shoulders and along the tapered inner ends and being bonded thereto, the element forming a direct wall between the shoulder ends of the members said wall being larger over the space between the members than at points nearer the shoulders and resilient throughout the wall to the outer periphery of the joint, the openings in the joint extending from the openings in the member into the element.

TOM L. YATES.